United States Patent

Nakagawa

[11] Patent Number: 5,199,207
[45] Date of Patent: Apr. 6, 1993

[54] REEL LEG FIXING APPARATUS FOR FISHING ROD

[75] Inventor: Masayuki Nakagawa, Urawa, Japan
[73] Assignee: Daiwa Seiko, Inc., Tokyo, Japan
[21] Appl. No.: 786,285
[22] Filed: Nov. 1, 1991
[30] Foreign Application Priority Data Nov. 14, 1990 [JP] Japan ............................ 2-119242[U]

[51] Int. Cl.$^5$ ............................................. A01K 87/06
[52] U.S. Cl. .......................................................... 43/22
[58] Field of Search ........................................ 43/22, 23

[56] References Cited

U.S. PATENT DOCUMENTS

| 3,123,931 | 3/1964 | Stephens | 43/22 |
| 4,083,141 | 4/1978 | Shedd | 43/22 |
| 4,133,133 | 1/1979 | Casset | 43/22 |
| 4,355,480 | 10/1982 | Morishita | 43/22 |
| 4,578,890 | 4/1986 | Childre | 43/22 |
| 4,756,114 | 7/1988 | Ohmura | 43/22 |
| 4,903,427 | 2/1990 | Yamato | 43/22 |

Primary Examiner—Kurt C. Rowan
Attorney, Agent, or Firm—Kalish & Gilster

[57] ABSTRACT

A reel leg fixing apparatus for a fishing rod provided with two reel leg fixing sections between which the reel leg is inserted and fixed. One is fixed at the back side between the other is movably placed at the front side both of a reel leg mounting plane. The latter consists of two grasping sections over interior surface of which female screws are formed. These are screwed around individual male screws formed over the exterior surface of a reel leg mounting section of the fishing rod proper. At least one of the grasping sections is fixedly covered with a flexible member. Due to the double-nut effect, non-exposed screw composition and the flexible member, the reel leg can be fixed reliably and stably and the fishing rod can be grasped and held strongly or continuously for long time.

7 Claims, 5 Drawing Sheets

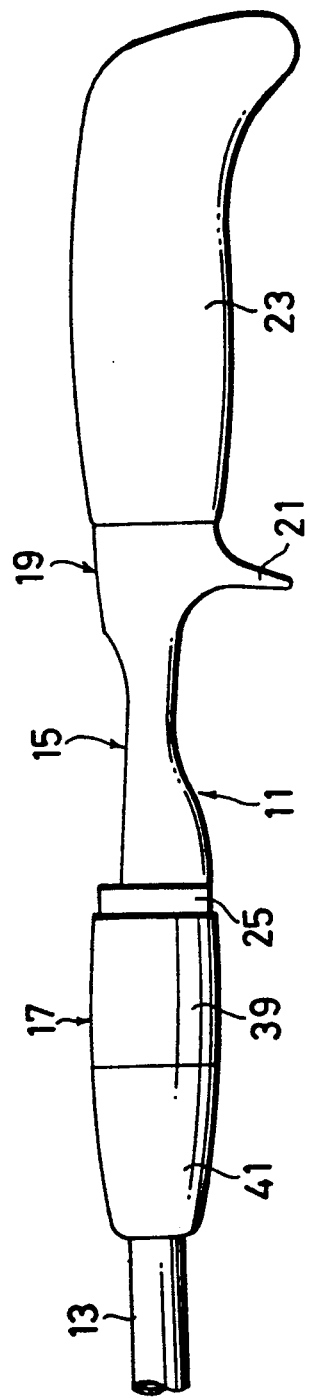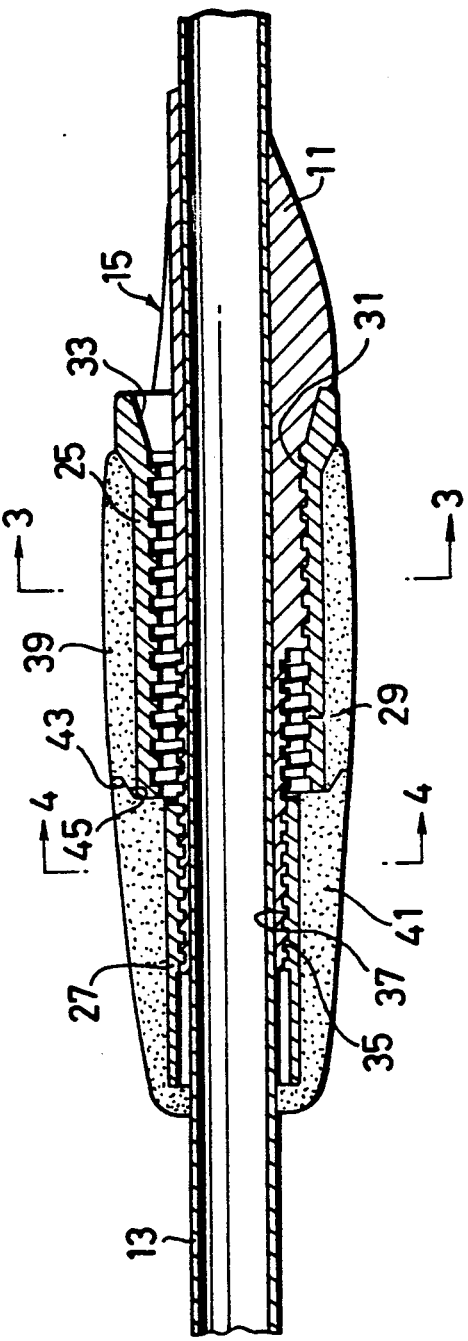

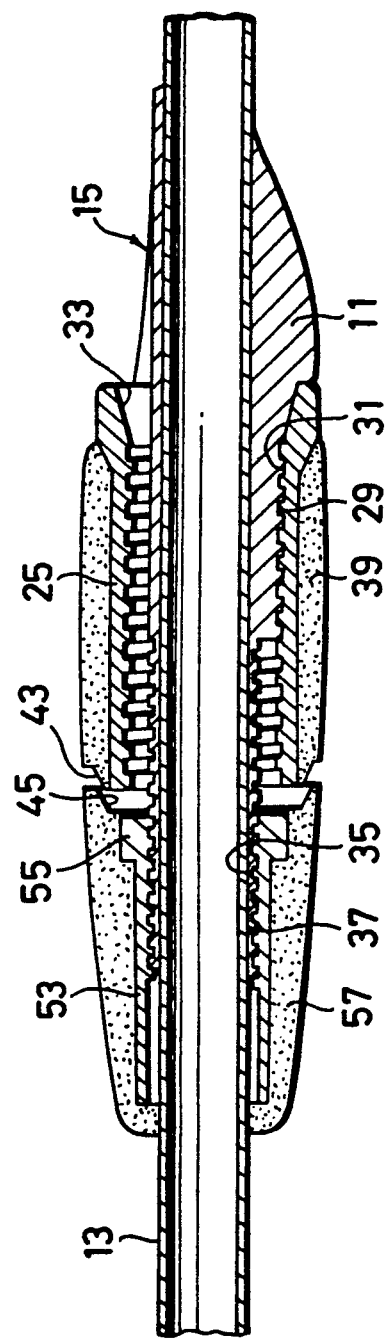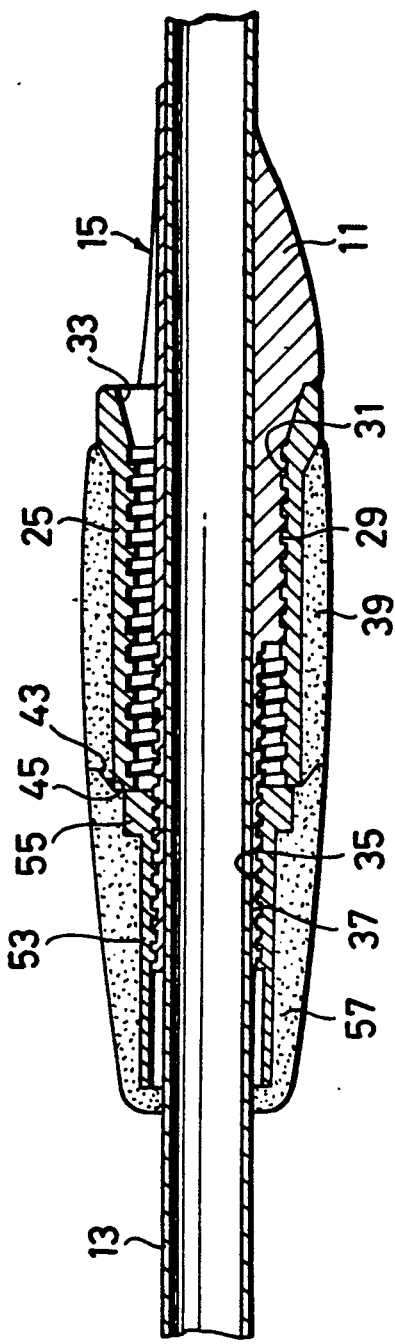

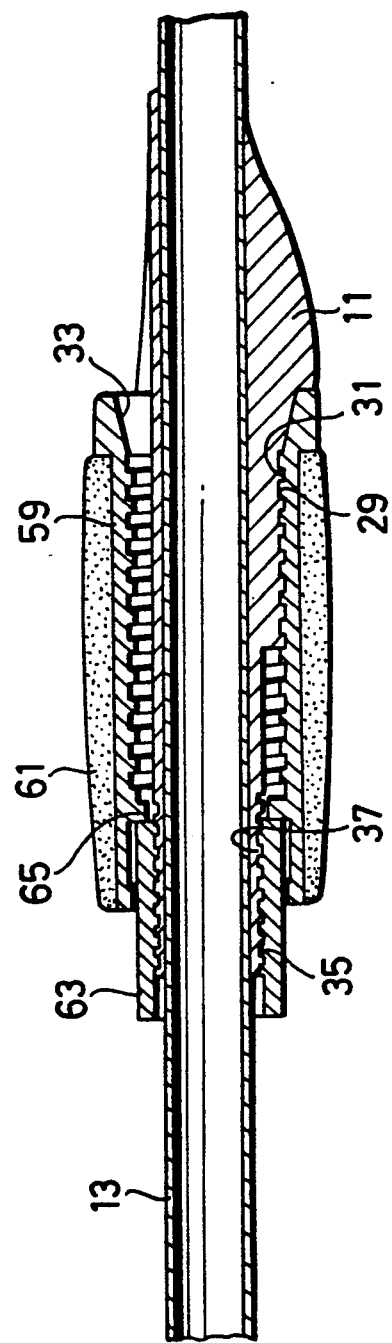

REEL LEG FIXING APPARATUS FOR FISHING ROD

BACKGROUND OF THE INVENTION

1. Field of the Invention

The present invention relates to a fishing rod and more particularly to a reel leg fixing apparatus which is used for fixing the leg of the fishing reel to the fishing rod.

2. Description of the Prior Art

In general, a fishing rod accompanied with a fishing reel is provided with the reel leg fixing apparatus which is used for fixing the leg of the fishing reel to the fishing rod.

By way of example of the prior art, the reel leg fixing apparatus disclosed by Japanese Utility Model laid-open Publication No. 168888/'77 and U.S. Pat. No. 4,216,603 is well known.

According to the disclosure, the reel leg fixing apparatus, being titled therein a reel seat, is provided with a fixed ring and a movable ring both surrounding the exterior perimeter of the seat proper. The fixed ring is fixed to the seat proper, whereas the movable ring is slidable forwardly and backwardly in longitudinal direction along the seat axis. Those two rings are so arranged that the leg of the fishing reel is fixed in a manner to be inserted there between. Surrounding the exterior perimeter of the seat proper, screw grooves comprising two helixes with winding directions opposite to each other are exposedly cut, over some extent of width along the seat axis, at the opposite side of the fixed ring with respect to the movable ring. A fixing nut, along interior perimeter of which is provided with helical screw thread, propels sliding of the movable ring by being screwed up through the above screw groove with one winding direction. After the reel leg is fixed by being inserted between the abovementioned two rings, an anti-loosening nut, along interior perimeter of which is also provided with helical screw thread, is screwed up through the above screw groove with another winding direction in order to prevent loosening of the fixing nut. Since winding directions of the helixes composing the screw threads provided inside the fixing nut and the anti-loosening nut are made opposite to each other, it is impossible to rotate those two nuts simultaneously into the same direction. Theoretically, therefore, the loosening is hardly to occur.

In the foregoing reel leg fixing apparatus of the prior art, however, it is hardly possible to grasp and hold the fishing rod strongly or continuously for long time, since the portion to be grasped is occupied by the fixing nut and the anti-loosening nut both with narrow width and further by the screw groove width along the seat axis cut over considerable extent of width along the seat axis surrounding the exterior perimeter of the seat proper.

On the other hand, practically, if the nut portion is grasped continuously, at first the fixing nut and consequently the anti-loosening nut are apt to be loosened, since both the nuts are merely screwed into the common and single male screw.

SUMMARY OF THE INVENTION

It is, therefore, an object of the present invention to provide a reel leg fixing apparatus for a fishing rod, which is easily graspable and holdable strongly or continuously for long time, by means of not only improving the whole structure over the grasping portion occupied by the narrow-width nuts and the exposedly cut screw groove but also covering the grasping portion with flexible members. It is another object of the present invention to provide a reel leg fixing apparatus for the fishing rod, which fixes the reel leg more reliably and stably due to double-nut effect even though grasped and held strongly or continuously for long time, by means of introducing wide-width double nuts respectively surrounding the exterior pertimeter of the same seat proper.

BRIEF DESCRIPTION OF THE DRAWINGS

FIG. 1 is a side view of the first embodiment of the reel leg fixing apparatus for the fishing rod according to the present invention.

FIG. 2 is an enlarged, partial longitudinal section showing in detail the front-side reel leg fixing section depicted in FIG. 1.

FIG. 7 is a longitudinal section of a third embodiment of the reel leg fixing apparatus for the fishing rod according to the present invention in open position.

FIG. 8 illustrates the apparatus of FIG. 7 in closed position.

FIG. 9 is a longitudinal section of a fourth embodiment of the reel leg fixing apparatus for the fishing rod according to the present invention.

DESCRIPTION OF THE PREFERRED EMBODIMENT OF THE INVENTION

Figure 3:
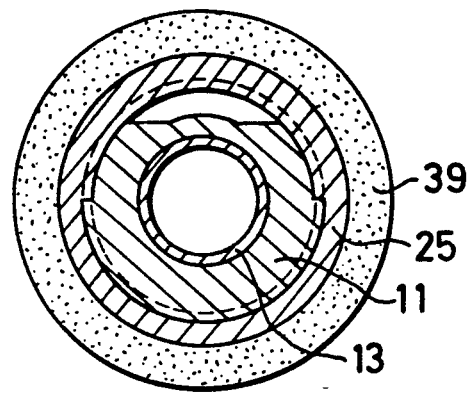
FIG. 3 is a cross section along line 3—3 of FIG. 2.
Figure 4:
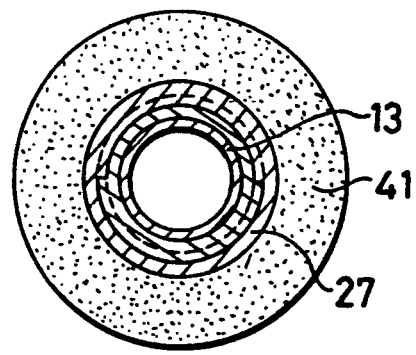
FIG. 4 is a cross section along line 4—4 of FIG. 2.

The preferred embodiment of the present invention will be described in detail hereinafter with reference to the accompanying drawings.

FIG. 1 shows a first embodiment of the reel leg fixing apparatus for the fishing rod according to the present invention when applied to the casting-handle type fishing rod.

In the figure, the code 11 indicates a reel leg mounting section formed at the backmost part of the fishing rod proper 13.

This reel leg mounting section 11 is provided with a reel leg mounting plane 15 to which the sole of the reel leg is fixed.

At the front side and the back side of this reel leg mounting plane 15, are placed a front-side reel leg fixing section 17 and a back-side reel leg fixing section 19 respectively.

At the underside of the back-side fixing section 19, is formed a projection 21 for resting the forefinger while, at the back-side end of the fishing rod is formed a grip 23.

In the first embodiment, the front-side reel leg fixing section 17 is composed of a first grasping section 25 which is placed at the reel leg mounting plane 15 side and a second grasping section 27 which is placed at the front side of the first grasping section 27. Along the interior perimeter of the first grasping section 25 made of hard resin or metal is formed a first female screw section 29. And this first female screw section 29 is screwed around a first male screw section 31 formed surrounding the exterior perimeter of the reel leg mounting section 11.

Along the interior perimeter of the back-side end of the first grasping section 25 is formed a taper section 33.

On the other hand, along the interior perimeter of the second grasping section 27 made of hard resin or metal is formed a second female screw section 35. And this second female screw section 35 is screwed around a second male screw section 37 formed surrounding the exterior perimeter of the fishing rod proper.

In this embodiment, the screw pitch of the second male screw section 37 is made shorter than the screw pitch of the first male screw section 29.

The exterior perimeter of the first grasping section 25 and of the second grasping section 27 are fixedly covered with a first flexible member 39, and a second flexible member 41 respectively both made of soft resin, cork or foamed resin.

In this embodiment, at the front-side end of the first flexible member 39 is formed an outside taper face 43. And this outside taper face 43 is just fitted to an inside taper face 45 formed at the back-side end of the second flexible member 41 so that the first flexible member 39 and the second flexible member 41 are connected continuously with each other.

As mentioned above, in this embodiment, the reel leg (not shown) is fixed by means that the first female screw section 29 of the first grasping section 25 is screwed around the first male screw section 31 and the first grasping section 25 is shifted to the reel leg mounting section 15 side. Whereas, both the first grasping section 25 and the second grasping section 27 are fixed by means that the second female screw section 35 of the second grasping section 27 is screwed around the second male screw section 37 and the second grasping section 27 is shifted to the first grasping section 25 side.

And, in this embodiment, at the front side and at the back side of the reel leg mounting plane 15 of the reel leg mounting section 11 formed on the fishing rod proper, are placed the front-side reel leg fixing section 17 and the back-side reel leg fixing section 19, respectively. The front-side reel leg fixing section 17 is composed of the first grasping section 25 which is placed at the reel leg mounting plane 15 side and the second grasping section 27 which is placed at the front side of the first grasping section 25. The first female screw section 29 formed along the interior perimeter of the first grasping section 25 is screwed around the first male screw section 31 formed surrounding the exterior perimeter of the reel leg mounting section 11, while the second female screw section 35 formed along the interior perimeter of the second grasping section 27 is screwed around the second male screw section 37 formed surrounding the exterior perimeter of the fishing rod proper. And, the exterior perimeters of the first grasping section 25 and of the second grasping section 27 are fixedly covered with the first flexible member 39 and the second flexible member 41 respectively, so that not only the fishing rod is made much easier to grasp and hold but also the reel leg can be fixed more reliably and stably.

That is, in this embodiment, since the front-side reel leg fixing section 17 is composed of the first grasping section 25 and the second grasping section 27, the first grasping section 25 and the second grasping section 27 form the double nut composition, which causes more reliable and stable fixing of the reel leg. Moreover, in this embodiment, the screw pitch of the second male screw section 37 is made shorter than the screw pitch of the first male screw section 25, consequently the double nut effect is more remarkable.

Furthermore, in this embodiment, the front side of the first flexible member 39 and the back-side end of the second flexible member 41 are so arranged as they are just fitted to each other at the respective taper face 43 and 45, therefore, the relative rotation between the first grasping section 25 and the second grasping section 27 can be more surely prevented even if the flexible members 39 and 41 are very strongly grasped.

Figure 5:
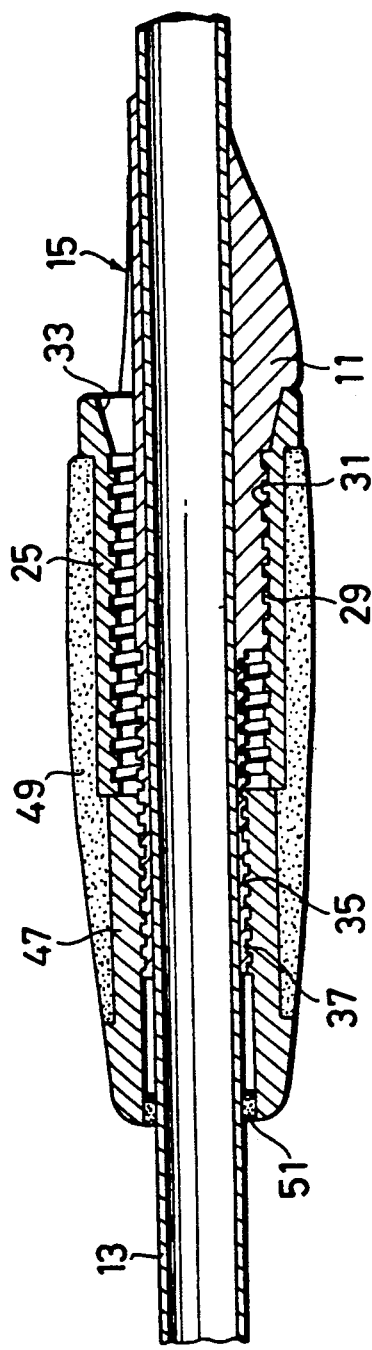
FIG. 5 is a longitudinal section of a second embodiment of the reel leg fixing apparatus for the fishing rod according to the present invention in closed position.
Figure 6:
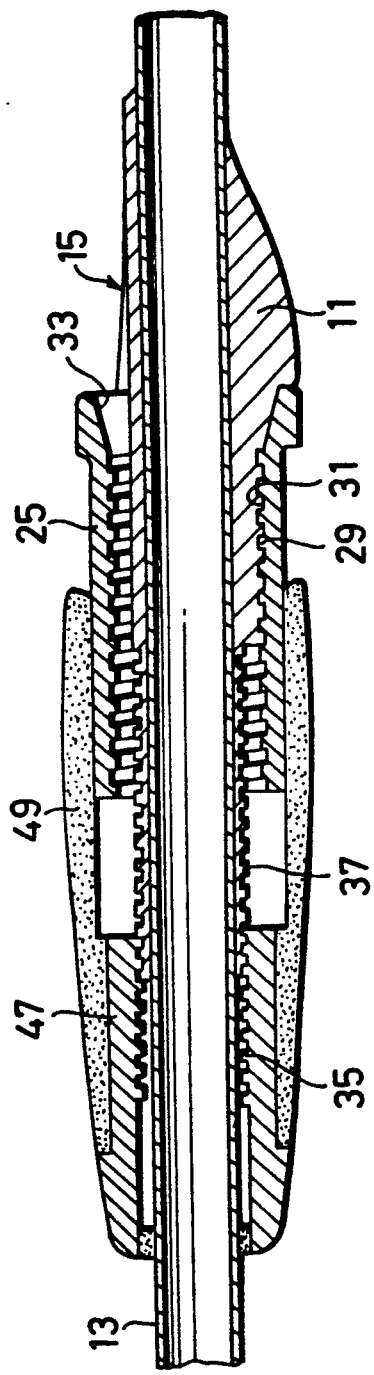
FIG. 6 illustrates the apparatus of FIG. 5 in open position.

FIG. 5 and FIG. 6 show a second embodiment of the reel leg fixing apparatus for the fishing rod according to the present invention. In the second embodiment, the exterior perimeters of the first grasping section 25 and the second grasping section 47 are covered with the flexible member 49 striding across both the grasping sections 25 and 47.

And, at the front-side end of the first grasping section 25 is fitted to the back-side end of the second grasping section 47. At the front-side end of the second grasping section 47, a cushion member 51 is provided between the second grasping section 47 and the fishing rod proper 13.

In this embodiment, when, at first, the first grasping section 25 is shifted to the reel leg mounting plane 15 side as shown in FIG. 6 and, next, the second grasping section 47 is shifted to the first grasping section 25 side, then the flexible member 49 fixed surrounding the exterior perimeter (annular side wall) of the second grasping section 47 fittedly covers the exterior perimeter of the first grasping section 25.

As mentioned above, in this embodiment also, almost the same effects can be obtained as those of the first embodiment. In this embodiment, however, since the flexible member 49 covering both the first grasping section 25 and the second grasping section 47 is unified, the portion to be grasped and held is jointless and hence the graspability and holdability is much more elevated.

And, in this embodiment, when the flexible member 49 is grasped, since it is unified, the first grasping section 25 and the second grasping section 47 are pressedly connected through the flexible member 49 so that the relative rotation between the first grasping section 25 and the second grasping section 47 is more certainly prevented.

Concerning this embodiment, an example which the flexible member 49 is fixed to the second grasping section 47 has been described. It is possible of course, however, that the flexible member 49 is fixed to the first grasping section 25 and the second grasping section 47 is made so as to be inserted into the flexible member 49.

FIG. 7 and FIG. 8 show a third embodiment of the reel leg fixing apparatus for the fishing rod according to the present invention. In the third embodiment, at the back side of the second grasping section 53, is unifiedly formed a larger-diameter ring section 55, which is made so as to be fitted to the front-side end of the first grasping section 25.

As mentioned above, in this embodiment also, almost the same effects can be obtained as those to the first embodiment. In this embodiment, however, since at first, the first flexible member 39 and the second flexible member 57 are fitted to each other and, next, the first grasping section 25 and the second grasping section 53 are fitted to each other, it is enabled that both the first grasping section 25 and the second grasping section 53 are much more reliably and stably fixed due to elasticity of both the flexible members 39 and 57 and of both the grasping sections 25 and 53.

FIG. 9 shows a fourth embodiment of the reel leg fixing apparatus for the fishing rod according to the present invention.

In this embodiment, the flexible member 61 is fixed surrounding the exterior perimeter of only the first grasping section 59.

Into the front-side end of the first grasping section 59, can be inserted the second grasping section 63 with an outside diameter sufficiently smaller than that of the first grasping section 59. And, the back-side end of the second grasping section 63 is fitted to a ring-shaped projection 65 formed along the interior perimeter (annular wall) of the first grasping section 65.

As mentioned above, in this embodiment also, almost the same effects can be obtained as those of the first embodiment.

In this embodiment, however, since the flexible member 61 is not attached surrounding the exterior perimeter of the second grasping section 61, the composition is much simpler and the second grasping section is not touched by hand.

In the above embodiments, description has been made only of examples in which the present invention is applied to the casting-handle type fishing rod. It is obvious of course, however, that the present invention is not restricted to such embodiments but can be applied to other embodiments, for example, to the spinning-handle type fishing rod.

Further, in the above embodiments, description has been made of an example which the hood section to fix the reel leg to the first grasping section 25 or 59 is unifiedly formed by the taper face 33. It is obvious of course, however, that the present invention is not restricted to such embodiments but the hood section can be formed by a separate member.

Furthermore, in the above embodiments, description has been made of an example in which the second male screw section 37 is unifiedly formed at the front-side end to the reel leg mounting section 11. It is also obvious of course, however, that the present invention is not restriced to such embodiments but the second male screw section can be formed on a member separate from the reel leg mounting section 11.

As mentioned above, in the first and second embodiments, loosening of the grasping sections can be surely prevented since the composition is such that the flexible member of one-side grasping section presses another-side flexible member or grasping section in a manner of anti-loosening of the screw. And graspability and holdability are much raised since surrounding the exterior perimeter of the flexible member appear no cracks and gaps which sometimes hurt the human hand.

What is claimed is:

1. A reel leg fixing apparatus for mounting on a fishing rod and penetration thereby entirely along the central longitudinal axis of said apparatus, comprising:
   a reel leg mounting section having a reel leg mounting plane formed directly or indirectly on the fishing rod proper,
   a front-side reel leg fixing section placed at the front side of said reel leg mounting plane,
   a back-side reel leg fixing section placed at the back side of said reel leg mounting plane,
   a first grasping section adapted at a rear end thereof for accepting and fixing a reel leg and composing said front-side reel leg fixing section placed at said reel leg mounting plane side, a first female screw section formed entirely around the interior annular side wall of said first grasping section being threadably engaged outwardly of and coaxially to a first male screw section formed entirely around the exterior annular side wall of said front side reel leg fixing section,
   a second grasping section composing said front-side reel leg fixing section placed at the front side of said first grasping section, a second female screw section formed entirely around the interior annular side wall of said second grasping section, said second female screw section being threadably engaged outwardly of and coaxially to a second male screw section formed coaxially outwardly entirely around the exterior annular side wall of the fishing rod proper forwardly in relation to said first male screw section,
   and a flexible member substantially covering the exterior annular side walls of said second grasping section and rotating therewith, to thereby provide more comfortable holding of the fishing rod and more reliable stable fixing of the reel leg to the fishing rod proper.

2. A reel leg fixing apparatus for a fishing rod according to claim 1 wherein at the back side of said second grasping section a ring section is unifiedly formed having a larger exterior diameter than the front-side end of said second grasping section and which can be fitted with said first grasping section at a front-side end thereof.

3. A reel leg fixing apparatus for a fishing rod according to claim 1 wherein one flexible member is formed so at to be striding across both said first and said second grasping sections.

4. A reel leg fixing apparatus for a fishing rod according to claim 1 wherein one of said at least one flexible member substantially covering at least one of the exterior annular side walls of said first and said second grasping sections is so composed as to inwardly pressedly hold at least one of another of said flexible members and said grasping section.

5. A reel leg fixing apparatus for a fishing rod according to claim 3 wherein said second grasping section has an outside diameter sufficiently smaller than the inside diameter of said first grasping section so as to be freely threadably inserted into and extracted from said front-side end of said first grasping section, and the back-side end of said second grasping section can be fitted to a ring-shaped projection formed around the interior annular side wall of said first grasping section forwardly thereon.

6. A reel leg fixing apparatus for a fishing rod according to claim 1 wherein the screw pitch of said second male screw section is shorter than the screw pitch of said first male screw section to thereby enhance the double-nut effect thereof.

7. The reel leg fixing apparatus of claim 1, wherein another flexible member substantially covers the exterior side walls of said first grasping section and rotates therewith.

* * * * *

UNITED STATES PATENT AND TRADEMARK OFFICE
CERTIFICATE OF CORRECTION

PATENT NO.   :   5,199,207
DATED        :   April 6, 1993
INVENTOR(S)  :   M. Nakagawa It is certified that error appears in the above-identified patent and that said Letters Patent is hereby corrected as shown below:

On the title page, in the Abstract item [57]:

Line 4, replace "between" with --whereas--.

Signed and Sealed this

Twenty-first Day of December, 1993

*Attest:*

BRUCE LEHMAN

*Attesting Officer*     *Commissioner of Patents and Trademarks*